United States Patent
Nazri et al.

(10) Patent No.: US 7,736,805 B2
(45) Date of Patent: Jun. 15, 2010

(54) LITHIUM HYDRIDE NEGATIVE ELECTRODE FOR RECHARGEABLE LITHIUM BATTERIES

(75) Inventors: Gholam-Abbas Nazri, Bloomfield Hills, MI (US); Luc Aymard, Amiens (FR); Yassine Oumellal, Amiens (FR); Aline Rougier, Amiens (FR); Jean-Marie Tarascon, Amiens (FR)

(73) Assignees: GM Global Technology Operations, Inc., Detroit, MI (US); Universite de Picardie, Jules Verne, Amiens (FR)

( * ) Notice: Subject to any disclaimer, the term of this patent is extended or adjusted under 35 U.S.C. 154(b) by 458 days.

(21) Appl. No.: 11/749,264

(22) Filed: May 16, 2007

(65) Prior Publication Data

US 2008/0286652 A1    Nov. 20, 2008

(51) Int. Cl.
*H01M 4/58* (2010.01)
*H01M 4/62* (2006.01)
*H01M 4/00* (2006.01)

(52) U.S. Cl. .................... 429/218.2; 429/217; 429/223; 429/231.6; 429/231.95

(58) Field of Classification Search ............ 429/231.95, 429/217, 218.2, 223, 231.6, 231.1
See application file for complete search history.

(56) References Cited

U.S. PATENT DOCUMENTS 4,707,422 A * 11/1987 de Neufville et al. ......... 429/48
4,833,046 A *  5/1989 Roy ............................. 429/50

FOREIGN PATENT DOCUMENTS

WO    WO 2006005892    *   1/2006

* cited by examiner

*Primary Examiner*—Patrick Ryan
*Assistant Examiner*—Thomas H. Parsons

(57) ABSTRACT

A lithium battery comprises a negative electrode composition that uses lithium hydride and a second metal. The negative electrode composition is activated by infusing lithium into particles of the second metal hydride to form lithium hydride and the second metal. As the battery is discharged lithium is released from the electrode and the second metal hydride formed. Charging of the battery re-infuses lithium into the negative electrode composition with the re-formation of lithium hydride.

12 Claims, 4 Drawing Sheets

LITHIUM HYDRIDE NEGATIVE ELECTRODE FOR RECHARGEABLE LITHIUM BATTERIES

TECHNICAL FIELD

This disclosure pertains to the use of lithium hydride with one or more other metals as a rechargeable negative electrode material for lithium battery applications. More specifically, this disclosure pertains to negative electrode compositions for lithium batteries comprising the hydrides of lithium and a second metal in which lithium hydride is formed during each charging of the battery and the hydride of the second metal is formed as the battery is discharged.

BACKGROUND OF THE INVENTION

Lithium batteries, sometimes described as lithium-ion batteries, offer the promise of high energy density because lithium is a very light element. They are used in lap top computers, power tools, and other portable devices that can use a source of relatively low potential electrical energy. Lithium batteries are also being developed for applications in automotive vehicles.

Metallic lithium, often intercalated in suitable layered carbon material as lithium ions, has been employed as a negative electrode for rechargeable lithium batteries. During discharge of the battery, lithium metal in the negative electrode is oxidized to lithium ions ($Li^+$) which enter the electrolyte, and during charging lithium ions in the electrolyte are reduced to lithium metal and re-deposited in the electrode. However, non-uniform deposition of lithium during the charging process generates dendritic lithium that may present difficulties in the operation of the cell. Much work has been expended to solve the lithium dendritic growth problem of the lithium battery, using various inhibitors and additives in the cells. One commercial solution has been to move to Li-ion systems in which the lithium metal negative electrode is replaced by a carbon-based electrode. However, the capacity of the carbon electrode is appreciably less than that of lithium metal. Thus, there is a motivation to devise alternative electrode materials for lithium-ion batteries.

There is a need for improved negative electrode compositions for lithium batteries.

SUMMARY OF THE INVENTION

In this disclosure, lithium hydride is used in combination with one or more second metals (or semi-metals or alloys) as part of a negative electrode composition for a rechargeable lithium-ion battery. In an assembled lithium battery, the negative electrode composition (anode) is used in combination with a suitable electrolyte and cathode. The electrolyte may, for example, be a lithium salt, such as lithium hexafluorophosphate ($LiPF_6$), dissolved in a solvent of mixed organic carbonates such as ethylene carbonate and dimethyl carbonate. Sometimes the electrolyte uses a gel to contain or constitute the electrolyte and sometimes the electrolyte includes a conductive polymer or lithium conducting ceramic. The cathode is often a composition (such as a transition metal oxide or phosphate) that can accept lithium ions transported from the anode through the electrolyte during discharge of the battery.

In an embodiment of the invention, in the charged state of the negative electrode composition, lithium is present substantially as small particles of its hydride (LiH) mixed with small particles of the second metal (or metals), present in its elemental oxidation state. As current is drawn from the battery lithium yields its hydrogen to the second metal particles (which become metal hydride particles) and lithium ions enter the electrolyte. When the battery is charged, lithium is infused into the negative electrode composition where it reacts with the second metal hydride to again form small particles of lithium hydride.

The preparation of a negative electrode composition will be described in an embodiment in which conductive carbon particles and a polymeric binder are used with a metal hydride. In this embodiment, lithium hydride is formed in situ in a precursor mixture for the electrode composition. Particles of a hydride of a second metal such as titanium hydride ($TiH_2$) or magnesium hydride ($MgH_2$) are mixed with particles of an electrically conductive carbon. Preferably the particles of the second metal hydride are quite small, for example, less than one micron in largest dimension. The mixing may be accomplished, for example, by ball milling. An amount of binder (e.g., a polymer based on ethylene-propylene-diene monomer and dissolved in xylene) is mixed with the carbon and metal hydride and the ink-like mixture is applied as an electrode film to a conductive electrode support (such as a copper foil) and dried. A stoichiometric amount (or more) of lithium metal is then electrochemically infused into the particulate precursor mixture on the electrode support.

A lithium foil may be used to infuse lithium ions through a suitable lithium ion-containing electrolyte and to deposit lithium metal into the precursor film on the electrode support. These electrochemical circuit elements are arranged and a direct current voltage applied to the lithium foil and the conductive electrode support. The lithium, infused into the negative electrode precursor material, reacts with the metal hydride particles in accordance with the following reaction equation:

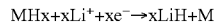

$$MHx + xLi^+ + xe^- \rightarrow xLiH + M$$

where M, is a metal, semi-metal, or an alloy such as, for example, titanium, magnesium, or a combination such as lanthanum and nickel ($LaNi_5$). The above reaction is reversible and provides the chemical basis for repeated discharging and charging of the negative electrode of a lithium battery.

It turns out that, in the course of the infusion of lithium into the precursor material and the following reaction, very small particles (often nanometer-size particles) of lithium hydride and the second metal are formed in-situ to provide an effective and active electrode material. The electrode material also can be made by direct chemical reduction of a suitable metal hydride by lithium or other known chemical/physical processes such as mechanical-milling and other known synthesis methods.

In assembly of a lithium battery, the mixture of lithium hydride, a second metal, and conductive carbon may be further mixed with a non-conductive polymeric binder and applied to a suitable electrode support, such as copper or nickel foil, and used as the negative electrode, the anode, during discharge of a battery. Preferably (but by way of example) the mixture of lithium hydride and a second metal or of metal hydride make up at least about seventy percent by weight of the negative electrode material; the conductive carbon makes up about twenty percent and polymeric binders about ten percent. Suitable polymeric binders include, for example, poly(vinylidine fluoride), co-poly(vinylidine fluoride-hexafluropropylene), poly(tetrafluoroethylene), poly(vinyl chloride), or poly(ethylene-propylene-diene monomer), EPDM.

The negative electrode material is assembled with a suitable electrolyte and a cathode material in forming a lithium battery. The electrolyte may, for example, comprise a lithium salt, such as lithium hexafluorophosphate (LiPF$_6$), dispersed in a non-aqueous organic material which may be liquid, gel, or polymeric in form. Any suitable cathode material may be used. Examples of lithium-based insertion cathode materials include LiFePO$_4$, LiMn$_2$O$_4$, LiCoO$_2$, and Li$_2$FeSiO$_4$.

Other objects and advantages of the invention will be apparent from the following description of preferred embodiments.

DESCRIPTION OF PREFERRED EMBODIMENTS

This invention provides a mixture of metals and metal hydrides for use as negative electrode material in a re-chargeable lithium-ion battery. In the charged state of the negative electrode the metal-metal hydride mixture consists essentially of lithium hydride and one or more other metals (sometimes called second metals in this specification). As the battery discharges, the lithium hydride is progressively transformed to lithium ions and the second metal is progressively converted to its hydride. The second metal is one which forms hydrides and is otherwise suitable for such charging and recharging reactions and exchanges with lithium. Examples of suitable second metals include lanthanum, magnesium, nickel, sodium, titanium, and mixtures of such metals. The second metal may include a semi-metal and/or an alloy.

During charging of the battery, the electrochemical reaction at the anode or negative electrode is:

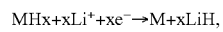

where M is a suitable second metal (having ability to form a hydride) as described above. The amounts of Li and M may be substantially stoichiometric with respect to the above equation or a small excess of lithium may be used. In many instances the metal and metal hydride particles are very small, often less than one micron in largest dimension.

During discharge of the lithium battery, the reverse electrochemical reaction is as follows:

In the electrochemical operation of the battery, it is expected that the electrode material may successfully experience repeated charging and discharging.

In the preparation of the negative electrode material, it is often preferable to mix the second metal hydride (for example, MgH$_2$ or TiH$_2$) with particles of conductive carbon and a suitable non-conductive polymeric binder.

EXAMPLE 1

Particles of magnesium dihydride (MgH$_2$) were ball milled and mixed with particles of electrically conductive carbon (e.g. Vulcan carbon, a high surface area carbon black) as a negative electrode precursor material. The powder was further mixed with a solution of PVDF polymer in dibutyl phthalate to disperse the polymer on the carbon/metal hydride particles and obtain an ink-like mixture. The ink-like material was coated on the surfaces of a nickel foil and dried to remove the solvent.

The precursor material-coated nickel foil was used as a cathode with a lithium foil anode in an electrochemical cell for insertion of lithium into the intimate carbon-magnesium hydride precursor mixture. The electrodes were pressed in contact with a porous polymeric separator material soaked with a liquid electrolyte comprising lithium hexafluorophosphate salt dissolved in a mixture of ethylene carbonate and dimethyl carbonate. A direct electrical current was applied to the lithium foil anode and the nickel foil cathode with its precursor mixture. The current was controlled at about 0.5 milliampere per square centimeter of cathode surface to progressively infuse lithium into the magnesium hydride-containing electrode.

Figure 1:
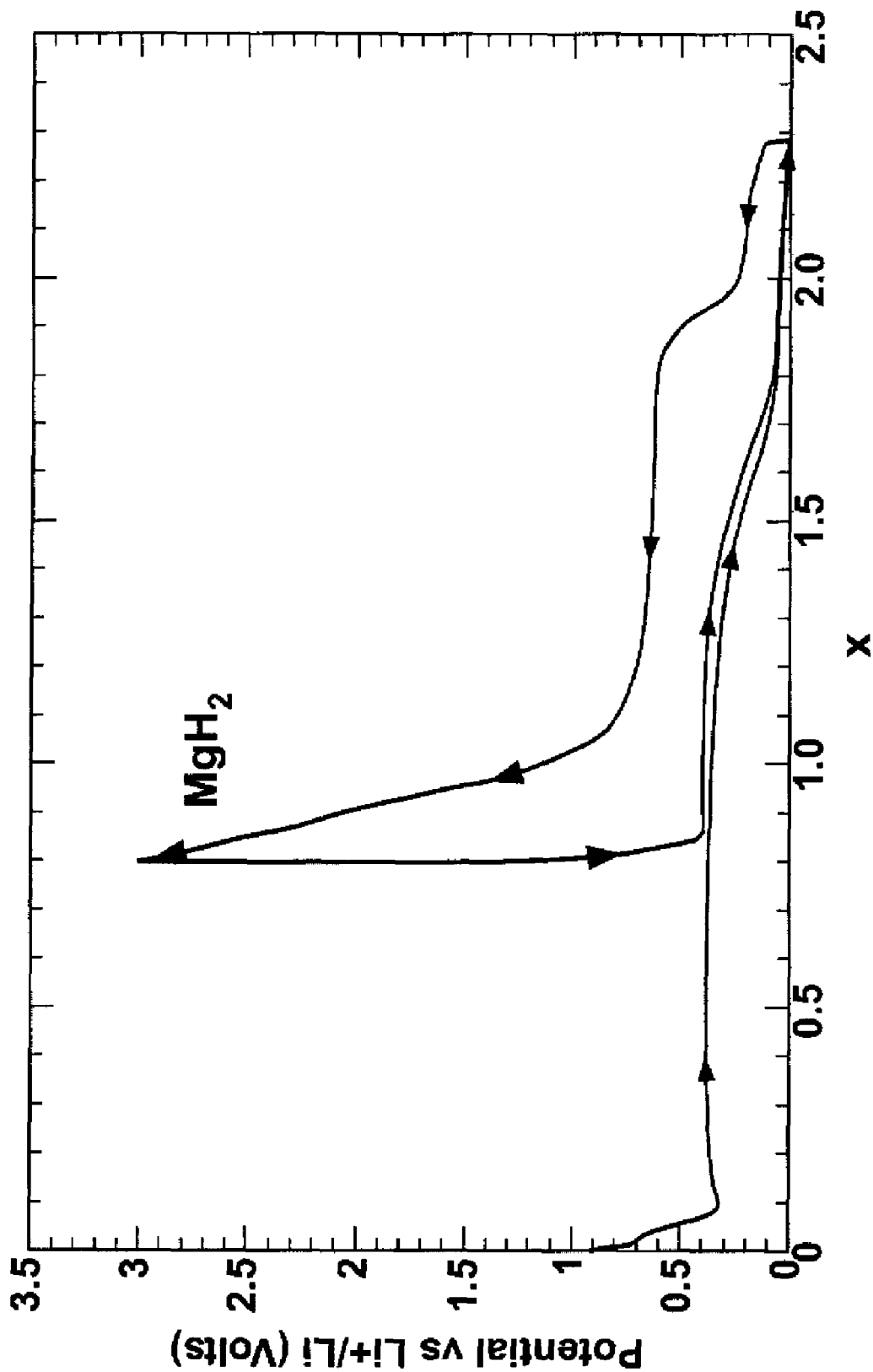
FIG. 1 is a graph of direct current potential (volts) vs. mole fraction of lithium, x. The graph was produced by passing a direct current to infuse lithium from a lithium foil through a lithium salt containing electrolyte into an electrode film of magnesium hydride (MgH$_2$) mixed with conductive carbon. The infused lithium reacted with the magnesium hydride to form lithium hydride and magnesium. After lithium was transferred from the anodic lithium foil to the cathodic magnesium hydride electrode the current was reversed to transfer the lithium from the lithium hydride electrode back to the lithium foil. The graph shows the variation in voltage as the molar content of lithium (x) in the magnesium/magnesium hydride/lithium hydride mixture varies as the reversible electrochemical reactions progress.

FIG. 1 is a graph recording the cell voltage profile of the lithium foil and lithium hydride precursor film as lithium was progressively deposited on the carbon/magnesium hydride film and underwent a conversion reaction with the magnesium hydride to form lithium hydride in the precursor electrode film. The y-axis records the voltage between the lithium hydride forming cathode and the lithium foil anode as the mole fraction (x) of lithium (see x-axis) in the initially magnesium hydride material gradually increases.

As the electrical current was initially applied, the dc voltage dropped from about 0.9 volt (about 900 mV) to 300-400 mV and lower as lithium was infused into the cathode as indicated by the increasing values of x from 0 toward 2. The directional arrow in the voltage value curve pointing to the right reflects the infusion of lithium onto the cathode and the conversion reaction of lithium with magnesium hydride to form lithium hydride. Two moles of lithium are required for stoichiometric conversion of $MgH_2$ to LiH and magnesium metal. As the conversion of magnesium hydride approached completion, the voltage is seen to drop as the infused lithium was then alloying with magnesium. In this example, excess lithium (to x=about 2.3) was infused into the magnesium material to form a mixture of magnesium and magnesium-lithium alloy particles in addition to the lithium hydride particles.

X-ray diffraction testing of the magnesium/lithium hydride electrode material confirmed the above-described progress of the infusion of lithium into the magnesium hydride precursor material and the reaction of lithium with magnesium hydride to form lithium hydride and magnesium.

The current flow between the lithium foil and the lithium hydride-containing electrode was then reversed (the left-pointing directional arrow at the right side of FIG. 1) to transfer lithium, first from the magnesium-lithium alloy particles (voltage about 200-300 mV) and then from the lithium hydride/magnesium electrode (further increasing voltage) back to the lithium foil electrode. As lithium was transported from the lithium hydride-containing electrode (x decreasing from about 2.3 to 0.8-0.9) the voltage increased to about 3 volts. At this point in the testing the polarity was again reversed between the magnesium hydride electrode (still with x>0.8) and the lithium foil electrode. Lithium was again transferred from the lithium foil into the lithium hydride, magnesium hydride electrode at an initial voltage of about 400 mV. This current and voltage cycling demonstrated the reversibility of the magnesium/magnesium hydride/lithium/lithium hydride negative electrode composition. This negative electrode material is suitable for use in combination with a lithium ion conducting electrolyte and a lithium ion accepting cathode in a rechargeable lithium battery assembly. It has been found that the cell voltage difference between charge and discharge is about 300 mV which is by far the lowest polarization potential ever measured for conversion type materials. Conversion reactions with fluorides, oxides, and nitrides give voltage polarization values of 1.1, 0.9, and 0.5 volts, respectively.

Other organic or inorganic solvents and other lithium salts can be used for the make-up of the electrolytes. Solid state electrolytes using ceramics, polymers, and/or gels may also be employed.

EXAMPLES 2-5

Negative electrode precursor materials were also prepared with sodium hydride (NaH), titanium hydride ($TiH_2$), lanthanum-nickel hydride ($LaNi_5H_5$), and magnesium-nickel hydride ($Mg_2NiH_4$). As in Example 1 amounts of each of these second metal hydrides were, respectively, mixed with Vulcan conductive carbon and binder and applied as inks to form lithium hydride precursor compositions on nickel foil electrode supports. Electrochemical cells with lithium foil and lithium salt electrolyte were prepared as described above with respect to magnesium hydride precursor material.

In each example a constant dc current was passed through the cell to infuse lithium metal from the lithium foil into the precursor electrode material. The graphs of FIGS. 2-5 record the voltages as lithium was infused into the respective electrodes and reacted with the precursor material to form lithium hydride and nanometer-scale particles of a second metal.

Figure 2:
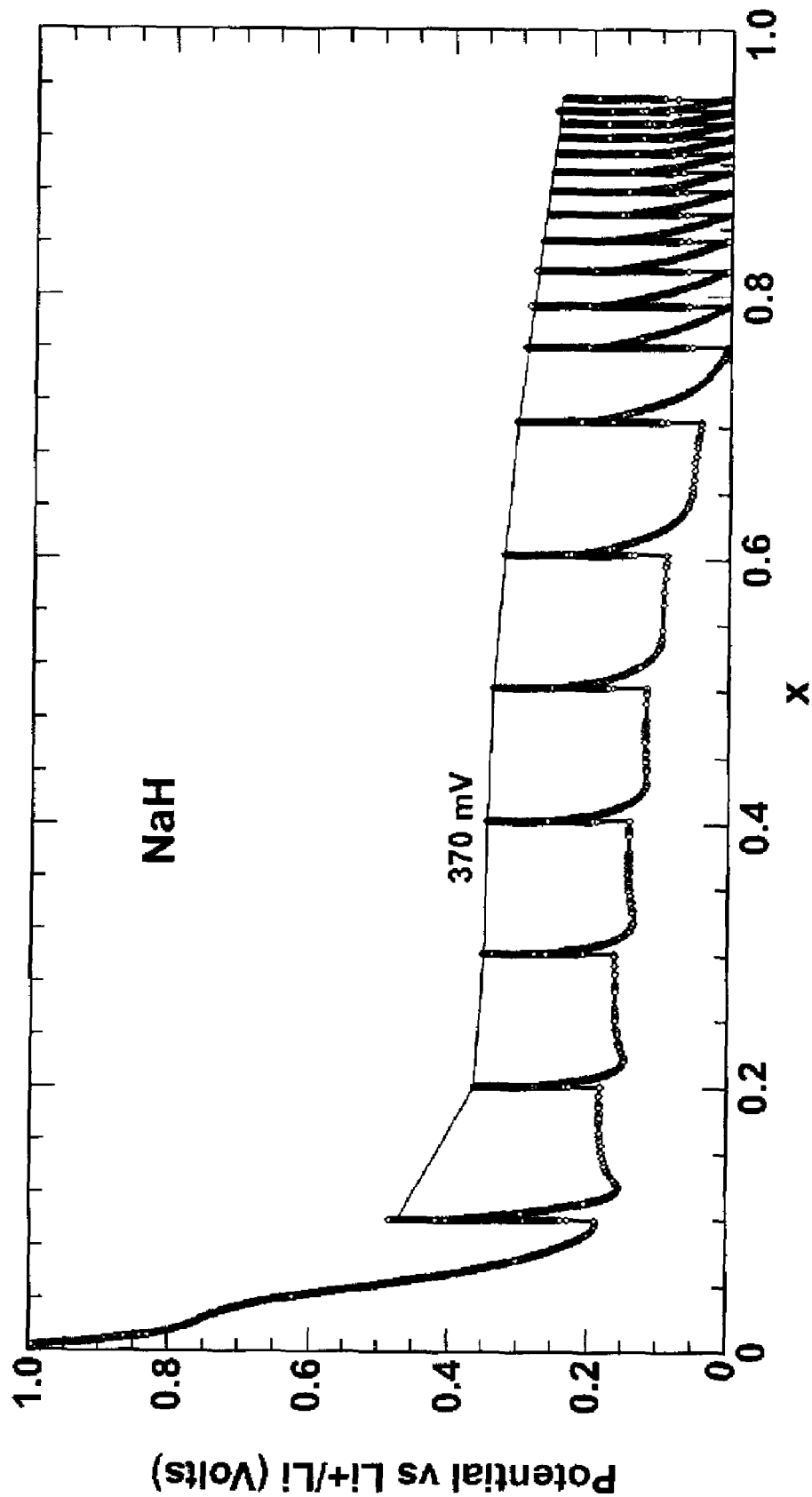
FIG. 2 is a graph of direct current potential (volts) vs. mole fraction of lithium, x like that in FIG. 1 obtained using an electrode initially containing sodium hydride (NaH) particles mixed with conductive carbon. The cell potential was monitored. The graph shows the variation in the cell voltage as the molar content of lithium (x) in the sodium/sodium hydride/lithium hydride mixture varies as the reversible electrochemical reactions progress.

FIG. 2 presents the voltage data for NaH precursor material as the infused lithium content increases from x=0 to x=nearly 1 at voltages averaging about 370 mV. The fluctuating voltage observed in the FIG. 2 curve occurred because a current interruption technique (intermittent titration) was employed to monitor the resistivity of the cell during lithium infusion into the sodium hydride electrode.

Figure 3:
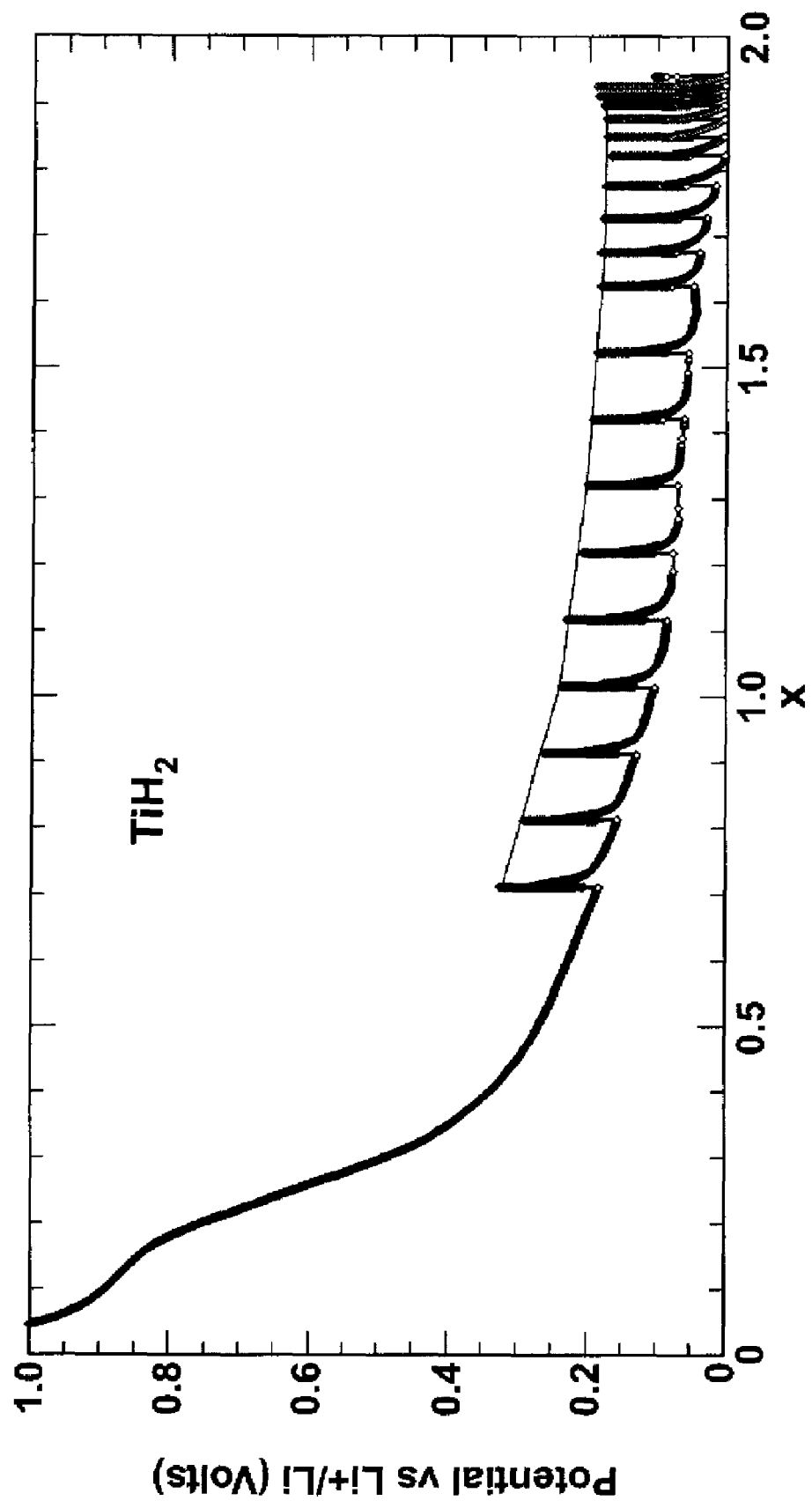
FIG. 3 is a graph of direct current potential (volts) vs. mole fraction of lithium, x like that in FIG. 1 obtained using an electrode initially containing titanium hydride (TiH$_2$) particles mixed with conductive carbon. The cell potential was monitored. The graph shows the variation in voltage as the molar content of lithium (x) in the titanium/titanium hydride/lithium hydride mixture varies as the reversible electrochemical reactions progress.

FIG. 3 presents voltage data for $TiH_2$ precursor material as the infused lithium content increases from x=0 to x=nearly 2 at voltages averaging about 200 mV. Again, the fluctuating voltage observed in the FIG. 3 curve occurred because a current interruption technique was employed to monitor the resistivity of the cell during lithium infusion into the titanium hydride electrode.

Figure 4:
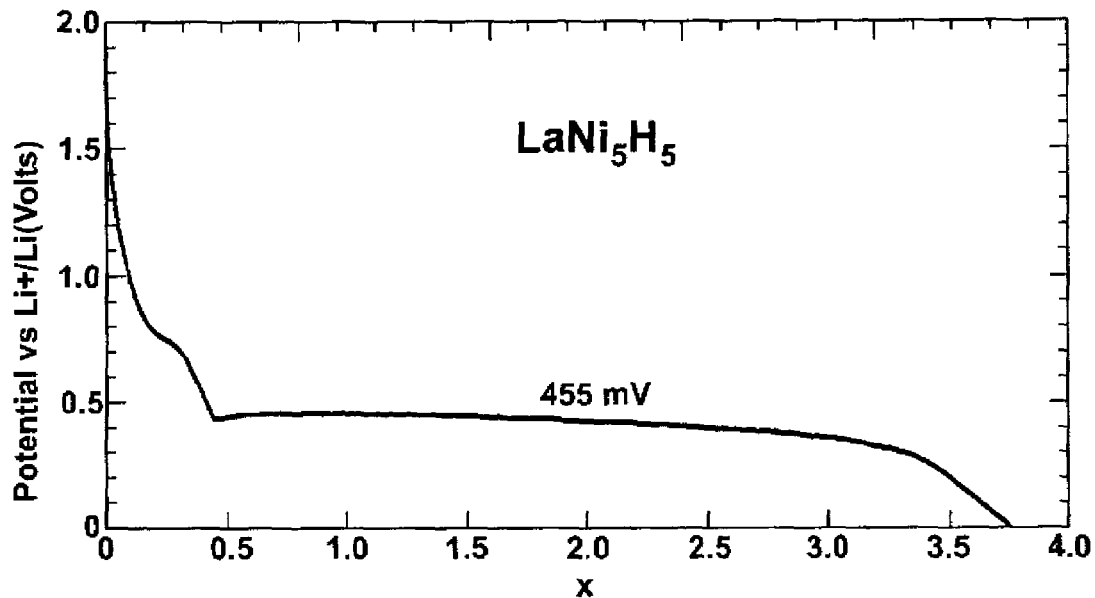
FIG. 4 is a graph of direct current potential (volts) vs. mole fraction of lithium, x like that in FIG. 1 obtained using an electrode initially containing lanthanum nickel hydride (LaNi$_5$H$_5$) particles mixed with conductive carbon. The cell potential was monitored. The graph shows the variation in voltage as the molar content of lithium (x) in the lanthanum-nickel/lanthanum-nickel hydride/lithium hydride mixture varies as the reversible electrochemical reactions progress.

FIG. 4 presents voltage data for $LaNi_5H_5$ precursor material as the infused lithium content increases from x=0 to x=nearly 3.8 at voltages averaging about 455 mV.

Figure 5:
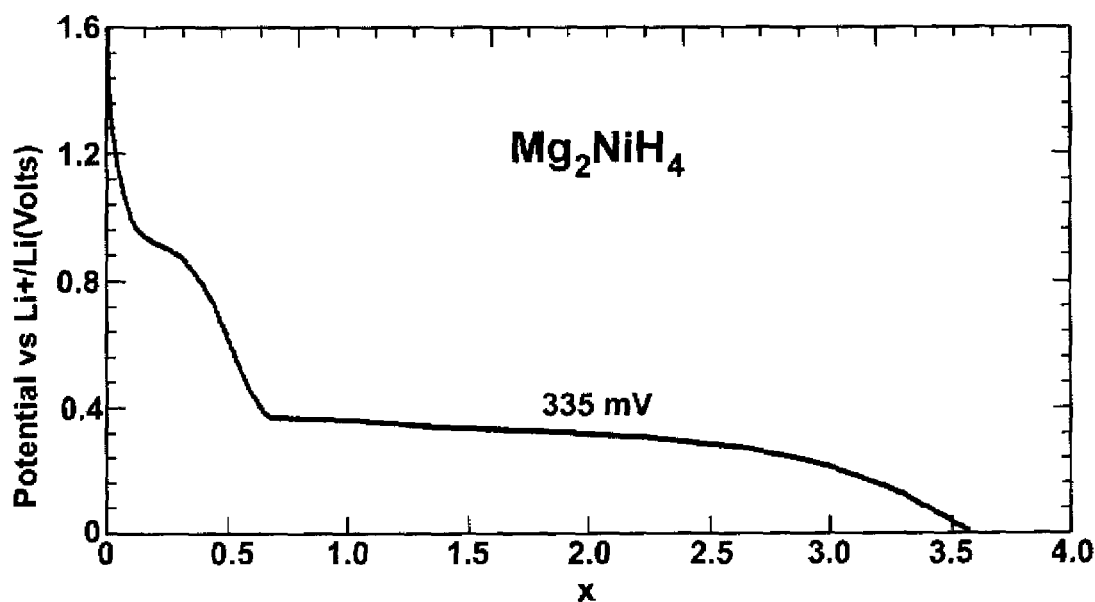
FIG. 5 is a graph of direct current potential (volts) vs. mole fraction of lithium, x, like that in FIG. 1 obtained using an electrode initially containing magnesium-nickel hydride (Mg$_2$NiH$_4$) particles mixed with conductive carbon. Then the cell potential was monitored. The graph shows the variation in voltage as the molar content of lithium (x) in the magnesium-nickel/magnesium-nickel hydride/lithium hydride mixture varies as the reversible electrochemical reactions progress.

FIG. 5 presents voltage data for $Mg_2NiH_4$ precursor material as the infused lithium content increases from x=0 to x=nearly 3.6 at voltages averaging about 335 mV.

The average voltage plateau for lithium infusion into the hydrides tested in the above examples was about 300-450 mV using the lithium foil electrode. However, there was some variation in these voltage plateau values because the respective hydride electrodes had different resistivity values and different polarization effects due to different conversion reaction kinetics.

It has been shown that hydrides of one or more second metals (second metals including suitable alloys or semi-metals) may be used as precursor materials for the formation of a lithium hydride-containing and second metal-containing, rechargeable, negative electrode for a lithium-ion battery. Second metal hydrides are suitable for use as precursor materials where lithium may be repeatedly infused into a particulate mass of the hydrides and react in a conversion reaction to form lithium hydride and a residue of the second metal or mixture of second metals.

In addition to the metal and hydride content of the negative electrode composition it is preferred to mix these materials with a suitably conductive carbon powder to contribute to the electrical conductivity of the electrode material. In general, a carbon powder content up to about twenty percent by weight of the total electrode material may be suitable for this purpose.

In some electrode embodiments it will be helpful to employ a non-conductive polymer binder material to fix the active electrode composition to an electrode support structure. In general, such binder content need not exceed about ten percent by weight of the total electrode material excluding a support structure.

Practices of the invention have been shown by examples that are presented as illustrations and not limitations of the invention.

The invention claimed is:

1. A negative electrode for a lithium ion battery, the electrode comprising, in its charged state, a composition comprising a mixture of particles of lithium hydride and at least one metal element other than lithium; the lithium being transferred from the electrode during discharge of the battery with concurrent formation of a hydride of the other metal element(s) and the hydride of the other metal element(s) being reactive with lithium being transferred into the electrode during charging of the battery to form lithium hydride.

2. A negative electrode for a lithium battery as recited in claim 1 in which the composition further comprises electrically conductive carbon particles.

3. A negative electrode for a lithium battery as recited in claim 1 in which the composition further comprises a polymeric binder to bond the composition to an electrode support.

4. A negative electrode for a lithium battery as recited in claim 1 in which the at least one metal element other than lithium comprises one or more of lanthanum, magnesium, nickel, sodium, and titanium.

5. A lithium battery having a rechargeable negative electrode, the electrode comprising, in its charged state, a composition comprising a mixture of particles of lithium hydride and at least one metal element other than lithium; the lithium being transferred from the electrode during discharge of the battery with concurrent formation of a hydride of the metal element(s) and the hydride of the other metal element(s) being reactive with lithium being transferred into the electrode during charging of the battery to form lithium hydride.

6. A lithium battery as recited in claim 5 in which the negative electrode composition further comprises electrically conductive carbon particles.

7. A lithium battery as recited in claim 5 in which the negative electrode composition further comprises a polymeric binder to bond the composition to an electrode support.

8. A lithium battery as recited in claim 5 in which the at least one metal element other than lithium of the negative electrode composition comprises one or more of lanthanum, magnesium, nickel, sodium, and titanium.

9. A lithium battery having a rechargeable negative electrode comprising lithium hydride in the charged state of the negative electrode.

10. A lithium battery as recited in claim 9 where the negative electrode further comprises at least one metal element other than lithium.

11. A lithium battery having a rechargeable negative electrode as recited in claim 9, the negative electrode comprising at least one of a binary metal hydride, $M_xH_y$, or a ternary metal hydride, $M_xM'_yH_z$, where such binary or ternary metal hydride is reversibly reactive with Li+ in the operation of the battery to form a mixture in the negative electrode comprising M, or M and M', mixed with LiH.

12. A lithium battery having a rechargeable negative electrode as recited in claim 11, in which the binary metal hydride or ternary metal hydride, LiH, and metal or metals are mixed with carbon in the negative electrode.

* * * * *